(12) United States Patent
Warey et al.

(10) Patent No.: US 11,316,217 B2
(45) Date of Patent: Apr. 26, 2022

(54) CONFIGURABLE THERMAL CONDITIONING OF BATTERY CELLS

(71) Applicant: GM Global Technology Operations LLC, Detroit, MI (US)

(72) Inventors: Alok Warey, Novi, MI (US); Chih-hung Yen, Bloomfield Hills, MI (US); Kuo-huey Chen, Troy, MI (US); Taeyoung Han, Bloomfield Hills, MI (US); Bahram Khalighi, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 363 days.

(21) Appl. No.: 16/407,616

(22) Filed: May 9, 2019

(65) Prior Publication Data

US 2020/0358151 A1  Nov. 12, 2020

(51) Int. Cl.
| | |
|---|---|
| H01M 10/00 | (2006.01) |
| H01M 10/655 | (2014.01) |
| H01M 10/6571 | (2014.01) |
| H01M 10/615 | (2014.01) |
| H01M 10/48 | (2006.01) |
| H01M 10/625 | (2014.01) |

(52) U.S. Cl.
CPC ....... *H01M 10/655* (2015.04); *H01M 10/486* (2013.01); *H01M 10/615* (2015.04); *H01M 10/625* (2015.04); *H01M 10/6571* (2015.04); *H01M 2220/20* (2013.01)

(58) Field of Classification Search
CPC .............. Y02E 60/50; H01M 10/6517; H01M 10/6555; H01M 50/209; H01M 10/655; H01M 10/6554
See application file for complete search history.

(56) References Cited

U.S. PATENT DOCUMENTS

| | | | |
|---|---|---|---|
| 9,013,144 B2 * | 4/2015 | Cooley | H01M 50/10 320/112 |
| 2013/0236753 A1 * | 9/2013 | Yue | H01M 50/20 429/62 |
| 2017/0279170 A1 * | 9/2017 | O'Hora | H01M 50/256 |

* cited by examiner

*Primary Examiner* — Cynthia H Kelly
*Assistant Examiner* — Monique M Wills
(74) *Attorney, Agent, or Firm* — Vivacqua Crane PLLC

(57) ABSTRACT

A battery cell thermal conditioning system for a vehicle includes a battery pack having multiple battery cells. Multiple foam layers are individually positioned between first successive ones of the battery cells. A first carbon nanotube sheet is positioned in direct contact with one of the battery cells on a first side of the foam layers and a second carbon nanotube sheet is positioned in direct contact with a different one of the battery cells on a second side of the foam layers. A cooling plate is positioned between second successive ones of the battery cells. A controller directs current flow to the first carbon nanotube sheet and the second carbon nanotube sheet when a temperature of the one of the battery cells contacted by the carbon nanotube sheet drops below a predetermined threshold temperature.

16 Claims, 4 Drawing Sheets

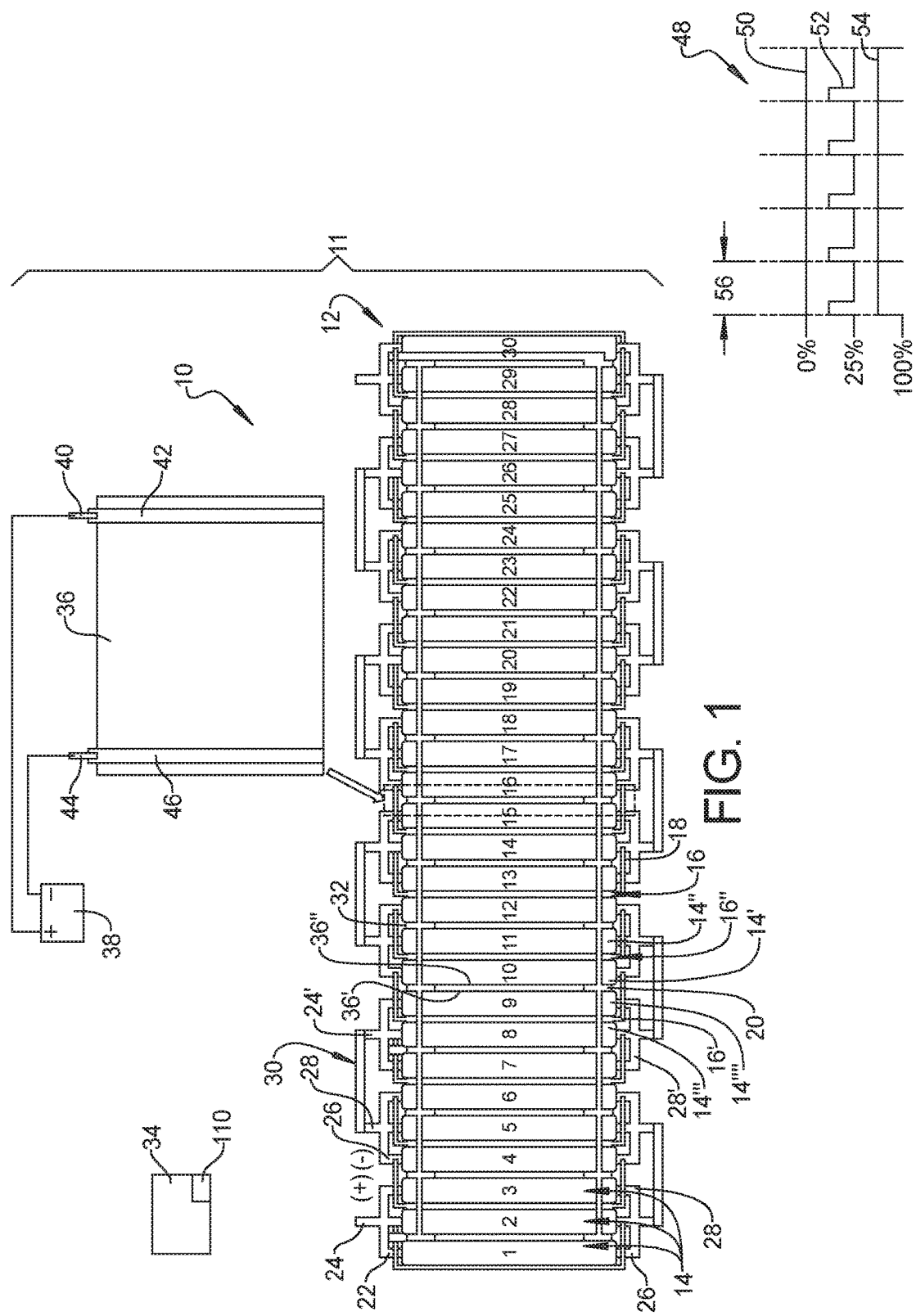

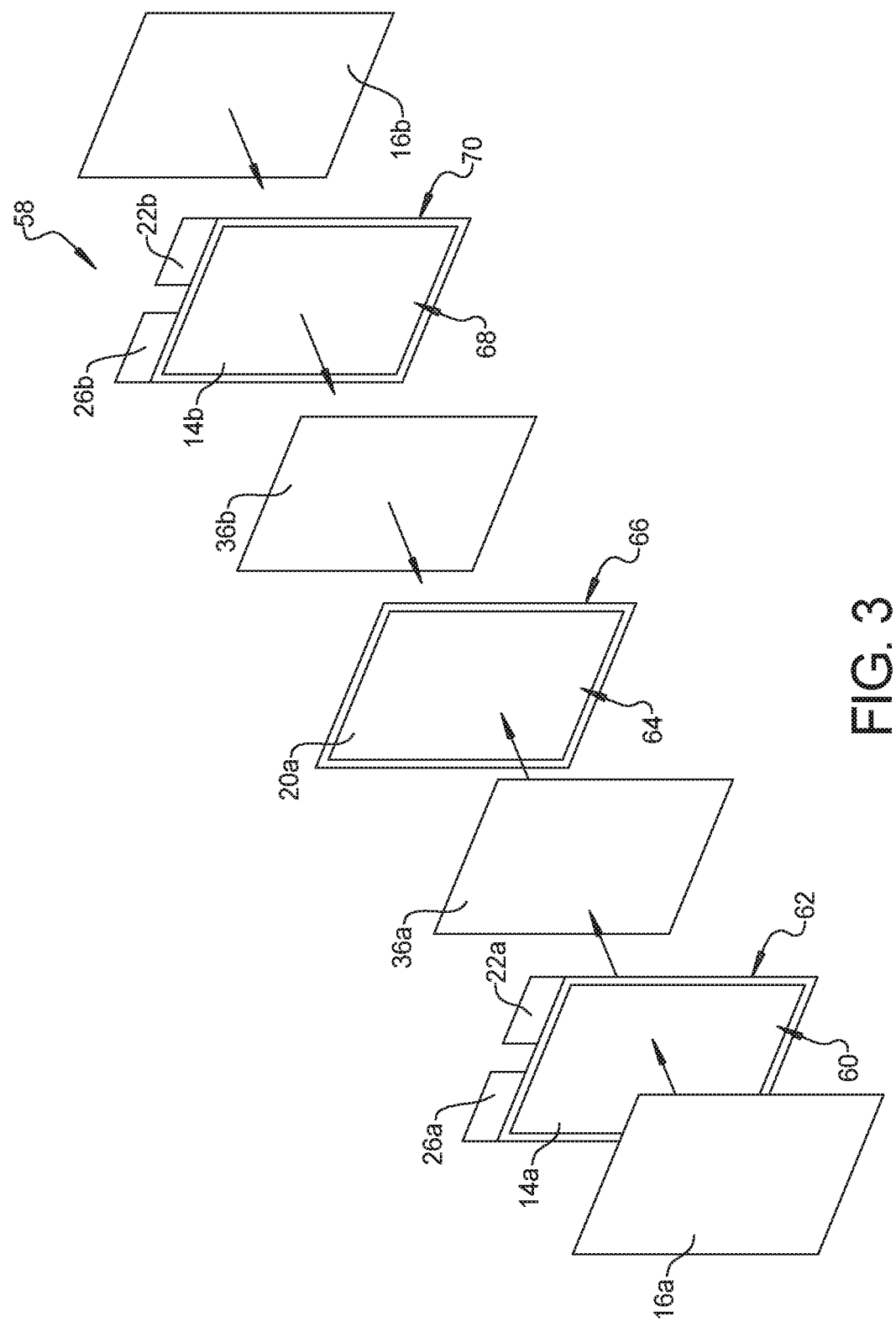

CONFIGURABLE THERMAL CONDITIONING OF BATTERY CELLS

INTRODUCTION

The present disclosure relates to vehicle battery cell charging and battery cell design, and in particular lithium-ion battery cell charging and lithium-ion battery design for electric powered vehicles.

Vehicle battery packs, particularly for lithium-based batteries, such as lithium-oxide batteries are susceptible to plating of metallic lithium (Li) during a battery charging process. Lithium plating occurs during fast charging of the battery pack and at low temperature environmental conditions when a temperature of the battery pack is below an optimum operating temperature range of approximately 25 to 35 degrees Centigrade. Lithium plating during charging is of particular concern when battery temperature is 10 degrees Centigrade or lower. Lithium plating is also of concern during battery fast charging operation, defined as charging in approximately 30 minutes or less. Lithium plating is particularly prevalent during fast charging operation and when the battery pack is at or below 10 degrees Centigrade. Plating of metallic lithium can induce lithium-ion (Li-ion) battery cell degradation or battery cell failure, which are a failure mechanism and an operating concern for an electric powered vehicle.

Methods to pre-heat the battery pack to avoid low temperature charging using heated air or fluid require additional components such as heating elements, pumps to induce flow and sensors. These systems have the potential to leak and create other failure events, and also add vehicle weight, negatively impact arrangement space, and increase cost.

Thus, while current lithium-ion battery designs achieve their intended purpose, there is a need for a new and improved system and method for allowing fast battery charging and charging at battery temperatures below 25 degrees Centigrade while mitigating lithium plating of individual lithium-ion battery cells.

SUMMARY

According to several aspects, a battery cell thermal conditioning system for a vehicle includes a battery pack having battery cells. A carbon nanotube sheet is positioned in proximity to one of the battery cells. A controller directs current flow to the carbon nanotube sheet when a temperature of the one of the battery cells drops below a predetermined threshold temperature.

In another aspect of the present disclosure, a power source independent of the battery pack provides the current flow upon command from the controller.

In another aspect of the present disclosure, the power source defines a 12 VDC battery or a 24 VDC battery.

In another aspect of the present disclosure, the carbon nanotube sheet includes: a positive terminal connected to a positive terminal of the power source; a negative terminal connected to a negative terminal of the power source; and a thickness of approximately 100 microns.

In another aspect of the present disclosure, the carbon nanotube sheet is positioned in direct contact with one of the battery cells and the controller directs the current flow to the carbon nanotube sheet until a temperature of the one of the battery cells increases to a minimum optimum temperature.

In another aspect of the present disclosure, the minimum optimum temperature is approximately 25 degrees Centigrade.

In another aspect of the present disclosure, a second carbon nanotube sheet is positioned in direct contact with a second one of the battery cells on a second side of the foam layer, the controller also directing the current flow to the second carbon nanotube sheet.

In another aspect of the present disclosure, the controller defines a pulse width modulated controller; and a voltage signal from the controller defines at least a 0% current flow, a 25% current flow and a 100% current flow.

In another aspect of the present disclosure, the 25% current flow is provided when the predetermined threshold temperature is at or above approximately 10 degrees Centigrade and below approximately 25 degrees Centigrade; and the 100% current flow is provided when the predetermined threshold temperature is below approximately zero degrees Centigrade.

In another aspect of the present disclosure, the carbon nanotube sheet is positioned at an inner wall of a housing which contains the battery pack, the carbon nanotube sheet when energized by the current flow producing radiant heat energy acting to heat the battery pack.

According to several aspects, a battery cell thermal conditioning system includes a battery pack having multiple battery cells. A foam layer is positioned between adjacent ones of the battery cells. A carbon nanotube sheet positioned in direct contact with one of the battery cells with the carbon nanotube sheet positioned on a first side of the foam layer. A controller directs current flow to the carbon nanotube sheet when a temperature of the one of the battery cells contacted by the carbon nanotube sheet drops below a predetermined threshold temperature.

In another aspect of the present disclosure, the controller directs the current flow to the carbon nanotube sheet until a temperature of the one of the battery cells increases to a minimum optimum temperature of approximately 25 degrees Centigrade.

In another aspect of the present disclosure, a second carbon nanotube sheet is positioned in direct contact with a second one of the battery cells on a second side of the foam layer, the controller also directing the current flow to the second carbon nanotube sheet.

In another aspect of the present disclosure, a battery control unit receives sensor signals from the battery pack and monitors a voltage of the battery pack. The power source defines a direct current battery independent of the battery pack providing the current flow upon command from the controller.

In another aspect of the present disclosure, the controller defines a pulse width modulated controller allowing current to the carbon nanotube sheet to be directly controlled within predetermined ranges and power levels to provide different heat-up rates for different temperature ranges of the battery pack.

In another aspect of the present disclosure, the foam layer is a polymeric material which is elastically compressible to allow thermal expansion and contraction of the battery cells and vibrational motion of the battery pack and the battery cells while mitigating against direct contact between any of the battery cells In another aspect of the present disclosure, a determination is performed if an immediate high battery demand follows a period of non-operation of the vehicle when an ambient temperature is below an optimum operating temperature of the battery pack but has not dropped to the predetermined threshold temperature, demanding current flow be initiated to the carbon nanotube sheet.

According to several aspects, a battery cell thermal conditioning system for a vehicle includes a battery pack having multiple battery cells and multiple sensors including a temperature sensor and a voltage sensor identifying a temperature and a voltage of the battery pack. Multiple foam layers are individually positioned between first successive ones of the battery cells. A first carbon nanotube sheet is positioned in direct contact with one of the battery cells on a first side of the foam layers and a second carbon nanotube sheet is positioned in direct contact with a different one of the battery cells on a second side of the foam layers. A cooling plate is positioned between second successive ones of the battery cells. A controller directs current flow to the first carbon nanotube sheet and the second carbon nanotube sheet when a temperature indicated by a temperature signal from the temperature sensor of the one of the battery cells contacted by the first or the second carbon nanotube sheet drops below a predetermined threshold temperature.

In another aspect of the present disclosure, a battery charging rate is determined to identify if a fast charging operation is present. A battery pack temperature condition is determined using the sensors to identify if a predetermined low temperature threshold is met at which current flow is initiated to the first and the second carbon nanotube sheets.

In another aspect of the present disclosure, a first face of the first one of the battery cells directly abuts the cooling plate to provide conductive cooling of the first one of the battery cells. A second face of the first one of the battery cells is oppositely directed with respect to the first face of the first one of the battery cells and directly abuts the first carbon nanotube sheet. A first face of the second one of the battery cells directly abuts the cooling plate opposite to the first face of the first one of the battery cells to provide conductive cooling of the second one of the battery cells. A second face of the second one of the battery cells is oppositely directed with respect to the first face of the second one of the battery cells and directly abuts the second carbon nanotube sheet.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a diagrammatic presentation of a battery cell thermal conditioning system according to an exemplary aspect;

FIG. 2 is a graph of multiple exemplary signal voltages over time used for controlling heat generation by carbon nanotube sheets;

FIG. 3 is an assembly diagram for an exemplary two-battery cell configuration of the present disclosure;

DETAILED DESCRIPTION

Figure 4:
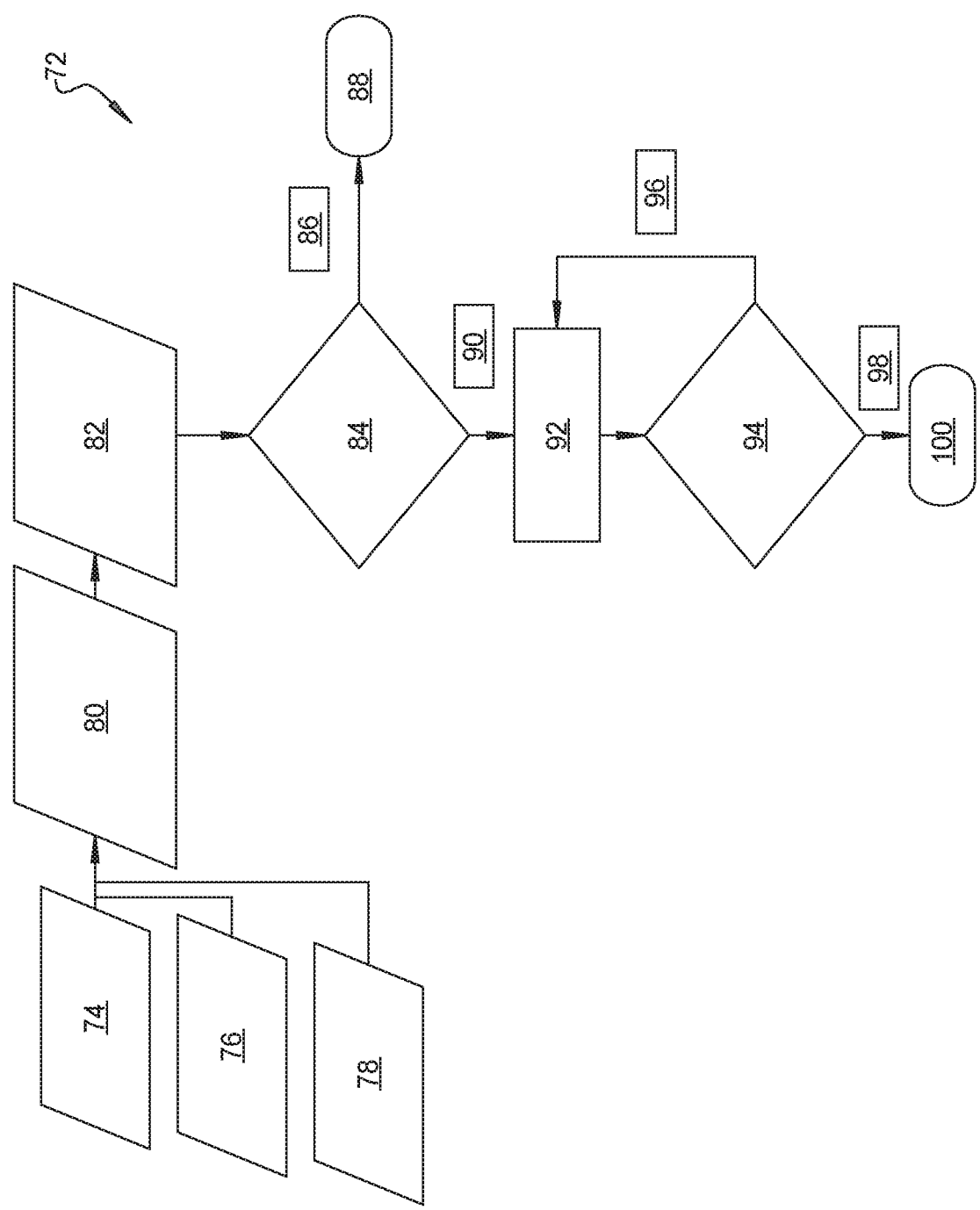
FIG. 4 is a flow diagram of a flow control program for controlling operation of the battery cell thermal conditioning system of FIG. 1.

The following description is merely exemplary in nature and is not intended to limit the present disclosure, application, or uses.

Referring to FIG. 1, a battery cell thermal conditioning system 10 for a vehicle 11 includes a battery pack 12 having multiple battery cells 14. Multiple metal plates 16 are positioned in the battery pack 12, with individual ones of the metal plates 16 separating successive pairs of the battery cells such as for example a first pair of battery cells 14', 14". Individual ones of the metal plates 16 function as cooling plates and can be supplied with a flow of a cooling fluid from a coolant passage 18. Sequential pairs of the battery cells such as the first pair of battery cells 14', 14" and a second pair of battery cells 14''', 14'''' are separated by a foam layer 20. The foam layer 20 is a polymeric material which is elastically compressible to allow thermal expansion and contraction of the battery cells and vibrational motion of the battery pack and battery cells while mitigating against direct contact between any of the battery cell pairs.

The battery cells 14 include a positive tab 22, with multiple positive tabs 22 interconnected at a positive terminal such as positive terminals 24, 24'. The battery cells 14 also include a negative tab 26, with multiple negative tabs 26 interconnected at a negative terminal such as negative terminals 28, 28'. Individual ones of the positive terminals 24 can be connected to individual ones of the negative terminals 28 using one or more connecting plates 30.

Multiple sensors 32 such as temperature sensors, pressure sensors, strain gages, and the like are provided at multiple locations within the battery pack 12. Signals from the multiple sensors 32 are communicated to a battery control unit 34 which monitors conditions such as voltage, temperature, charging rate and the like within the individual battery cells 14 and for the battery pack 12 in its entirety. When the battery control unit 34 identifies that a low temperature condition is present and/or a high charging rate condition is present the battery control unit 34 initiates a thermal conditioning stage. The low temperature condition is defined as a battery pack temperature or individual batter cell temperatures below a predetermined threshold temperature, for example below approximately 25 degrees Centigrade. The high charging rate condition is defined as a battery pack charging rate above a predetermined current or above a predetermined power rate (Amp-hr) for a predetermined period of time. A high charging rate is commonly present when a full charge or at least approximately an 80% battery charge is achieved in approximately 30 minutes.

When the battery control unit 34 identifies that the low temperature condition is present and/or the high charging rate condition is present and initiates the thermal conditioning stage, an electrical current is connected to one or more flexible and configurable carbon nanotube (CNT) sheets 36. According to several aspects, individual ones of the CNT sheets 36 are positioned on opposite faces of the foam layers 20. For example, a first CNT sheet 36' is positioned between the foam layer 20 and a battery cell 14'''' facing side of the foam layer 20 with the first CNT sheet 36' directly contacting the battery cell 14''''. A second CNT sheet 36" is positioned between the foam layer 20 and a battery cell 14' facing side of the foam layer 20 with the second CNT sheet 36" directly contacting the battery cell 14'. Because only a low voltage source can provide the electrical current, the electrical current is supplied by a power source 38 such as a 12 volt DC (direct current) battery or a 24 VDC (volt direct current) battery independently of the battery pack 12. A positive terminal 40 of the CNT sheets 36 is connected to a positive terminal of the power source 38, directing current flow through a CNT sheet positive busbar 42, and a negative terminal 44 of the CNT sheets 36 is connected to a negative terminal of the power source 38, directing current flow through a CNT sheet negative busbar 46.

According to several aspects the CNT sheets 36 are available from Nanocomp Technologies, Inc. located in Merrimack, N.H., United States. The CNT sheets 36 can be made for example as sheet material of pure carbon nanotube non-woven material. The CNT sheets 36 can have a thickness of approximately 100 microns and a length in millimeters or greater.

Current flow through the CNT sheets 36 rapidly heats, for example within approximately one minute or less, to transfer heat energy to the adjoining battery cell. The various sensors 32 of the battery pack 12 such as temperature sensors identify when the battery cell temperature exceeds a predetermined minimum operating temperature, for example approximately 25 degrees Centigrade. The battery control unit 34 then opens the circuit between the power source 38 and the CNT sheets 36 to stop battery cell heat-up. CNT sheets 36 of the present disclosure are capable of increasing from approximately 7 degrees Centigrade (room temperature) to approximately 130 degrees Centigrade in approximately one minute. CNT sheets 36 of the present disclosure therefore provide a rapid temperature increase of approximately 10 to 20 degrees Centigrade within several seconds (approximately 2 to 10 seconds) of being energized, thereby providing rapid heat-up of the battery cells 14 of the battery pack 12. This temperature increase of the battery cells 14 helps mitigate against lithium plating during rapid charging events and rapid battery power draw events when low temperature conditions are present.

According to an exemplary configuration of a battery cell thermal conditioning system 10 for a vehicle shown, the battery pack 12 has multiple battery cells 14, for example also sequentially numbered 01, 02, 03, 04, and the like. Foam layers 20 are individually positioned between first successive ones of the battery cells, such as for example between battery cells 01 and 02 and between first successive cells 09 and 10. A first carbon nanotube sheet such as carbon nanotube sheet 36' is positioned in direct contact with one of the battery cells, such as battery cell 09 on a first side of the foam layer 20 and a second carbon nanotube sheet such as the carbon nanotube sheet 36" positioned in direct contact with a different one of the battery cells, such as battery cell 10 on a second side of the foam layer 20. A first cooling plate 16' is positioned between second successive ones of the battery cells such as between battery cells 08 and 09 and a second cooling plate 16" is also positioned between second successive ones of the battery cells such as between battery cells 10 and 11. A controller 110 directs current flow to the first carbon nanotube sheet 36' and the second carbon nanotube sheet 36" when a temperature of the one of the battery cells such as the battery cell 09 or the battery cell 10 contacted by the carbon nanotube sheet 36 drops below the predetermined threshold temperature.

Referring to FIG. 2 and again to FIG. 1, a graph 48 identifies exemplary pulse width modulation (PWM) voltage signals for a 0% current flow 50 over time, a 25% current flow 52 and a 100% current flow 54 to individual or all CNT sheets 36. A common period 56 can be induced for the PWM voltage signals by the battery control unit 32 to maintain consistent battery cell heat-up rates. The different voltage signals inducing different current delivery to the CNT sheets 36 enables different heat-up rates depending for example on different predetermined ambient or battery pack temperature thresholds. For example, a higher current flow such as the 100% current flow 54 can be generated when battery pack temperatures are below approximately zero degrees Centigrade and a lower current flow such as the 25% current flow 52 can be generated when battery pack temperatures are originally above or rise above 10 or 15 degrees Centigrade.

Referring to FIG. 3 and again to FIG. 2, an exemplary battery cell pair 58 of the battery pack 12 includes a first metal plate 16a defining a cooling plate and a second metal plate 16b defining a cooling plate. A first face 60 of a first battery cell 14a directly abuts the first metal plate 16a to provide conductive cooling of the first battery cell 14a. The first battery cell 14a includes a positive tab 22a and a negative tab 26a. The positive tab 22a and the negative tab 26a are indicated to extend from a common side of the first battery cell 14a, however according to other aspects, the positive tab 22a and the negative tab 26a can extend from either opposite or successive ones of the sides of the first battery cell 14a. A second face 62 of the first battery cell 14a is oppositely directed with respect to the first face 60 and directly abuts a first CNT sheet 36a. A first surface 64 of a foam layer 20a is positioned to abut directly against the first CNT sheet 36a. A second surface 66 of the foam layer 20a oppositely directed with respect to the first surface 64 is positioned to abut directly against a second CNT sheet 36b.

A first face 68 of a second battery cell 14b directly abuts the second CNT sheet 36b opposite to the foam layer 20a. The second battery cell 14b includes a positive tab 22b and a negative tab 26b. The positive tab 22b and the negative tab 26b are indicated to extend from a common side of the second battery cell 14b, however similar to the first battery cell 14a, according to other aspects, the positive tab 22b and the negative tab 26b can extend from either opposite or successive ones of the sides of the second battery cell 14b. A second face 70 of the second battery cell 14b directly abuts the second metal plate 16b to provide conductive cooling of the second battery cell 14b. According to further aspects either the first CNT sheet 36a or the second CNT sheet 36b can be omitted if reduced battery pack heating provided by a single one of the CNT sheets positioned about the foam layer 20a meets the desired temperature threshold.

Referring to FIG. 4 and again to FIGS. 2 and 3, a diagram of a flow control program 72 identifies control steps for operation of the battery cell thermal conditioning system 10. In a first step 74 a battery charging rate is determined to identify if a fast charging operation is being performed. In a parallel second step 76 battery pack and/or ambient temperature conditions are determined using vehicle sensors (not shown) and battery pack temperature sensors such as sensors 32 to identify if a predetermined low temperature threshold is met at which current flow can be initiated to the CNT sheets 36. Also, in parallel with the first step 74 and the second step 76, in a third step 78 an operating schedule is determined. The operating schedule includes determination of an immediate high battery demand which follows a period of non-operation of the vehicle, for example when the vehicle is not operated overnight and when the ambient temperature has dropped below an optimum operating temperature of the battery pack 12 but has not dropped to the predetermined low temperature threshold, however the vehicle operator demands rapid vehicle acceleration upon startup. This operating schedule also demands current flow be initiated to the CNT sheets 36 due to the sudden high-power demand on the battery pack 12 which can also result in Lithium plating.

Following the first step 74, the second step 76 and the third step 78, in a fourth step 80 a battery pack fuel cell stack temperature is determined. The battery pack fuel cell stack temperature is calculated using output signals received from the various temperature sensors 32 in a fifth step 82. In a subsequent sixth step 84 a determination is made if the battery pack or fuel cell stack is at a safe operating temperature, defined as being above the predetermined low temperature threshold. If a response 86 to the determination performed in the sixth step 84 is YES, in a seventh step 88 the flow control program 72 stops. If a response 90 to the determination performed in the sixth step 84 is NO, a command step 92 is performed to activate current flow to the CNT sheets 36. In a following seventh step 94 a determination is made if a predetermined setpoint temperature of the battery pack or fuel cell stack has been achieved at which current flow to the CNT sheets 36 is stopped. If a response 96 to the determination performed in the seventh step 94 is NO, the predetermined setpoint temperature has not yet been reached and the program returns to the command step 92. If a response 98 to the determination performed in the seventh step 94 is YES, the predetermined setpoint temperature has been reached and in a eighth step 100 the flow control program 72 stops.

Figure 5:
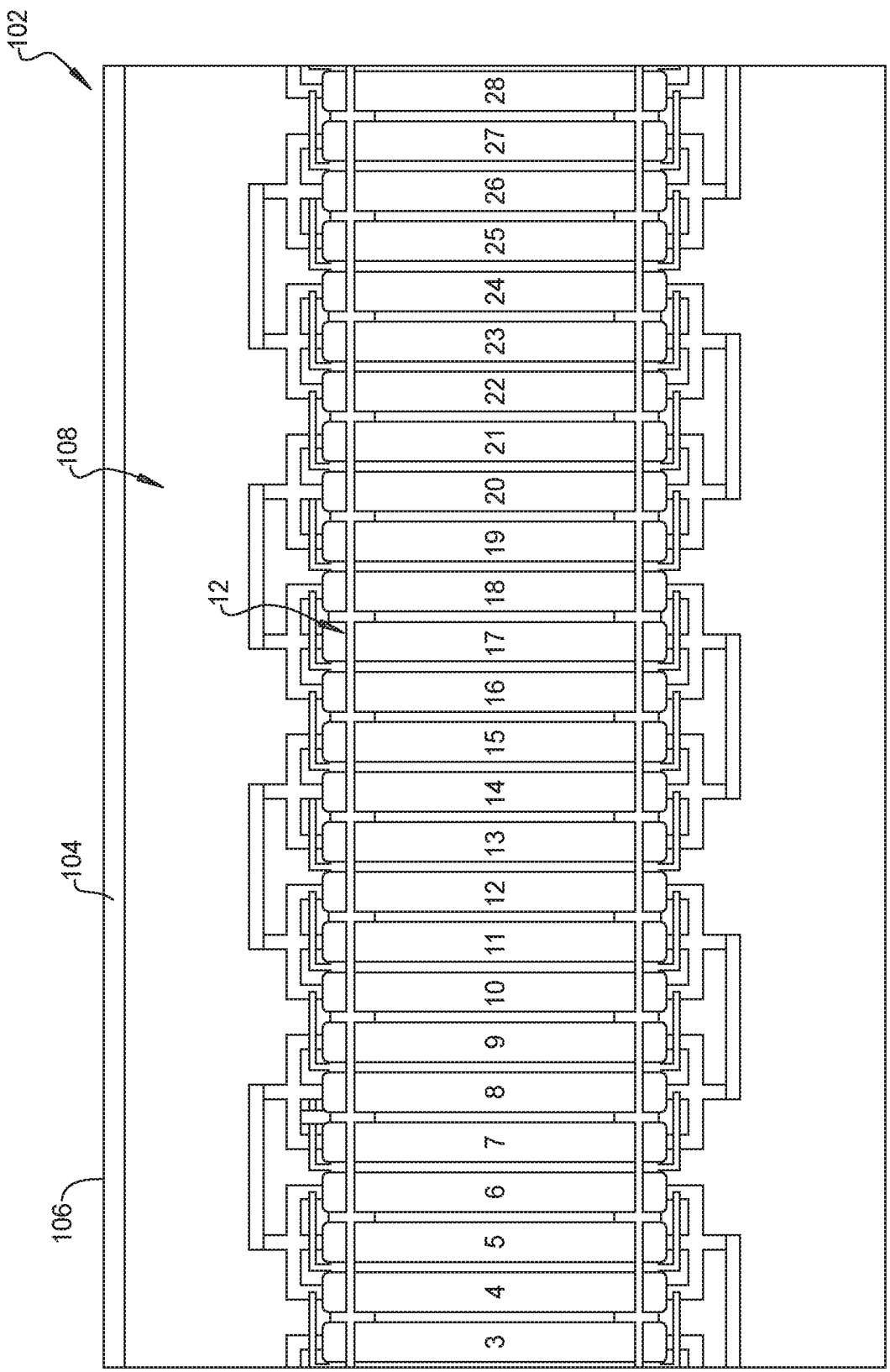
FIG. 5 is a diagrammatic presentation of a battery cell thermal conditioning system according to another aspect.

Referring to FIG. 5 and again to FIGS. 1 through 4, according to several aspects, in lieu of positioning one or more of the CNT sheets 36 directly against one or more of the foam layers 20, one or more CNT sheets 104 which operate similar to the CNT sheets 36 are positioned at an inner wall of a housing 106 which contains the battery pack 12. Similar program steps are performed as previously described in reference to the flow control program 72. If the battery pack or fuel cell stack is at or below the safe operating temperature, current flow to the one or more CNT sheets 104 is initiated which provide a source of radiant heat within the housing 106. The CNT sheets 104 radiate energy which heats an inner atmosphere 108 of the housing 106 and radiantly heats the battery pack 12. Additional CNT sheets 104 can be positioned about any of the accessible inner walls of the housing 106.

Referring again to FIGS. 1-5, thin, flexible and configurable carbon nanotube (CNT) based non-woven heating sheets are positioned in a battery pack between battery cells or against inner walls of the battery pack enclosure and are energized to heat up the battery cells through either direct contact or indirectly by radiant heating. The CNT sheets 36, 104 are connected to a power source such as either a 12 VDC or 24 VDC battery. A current is applied to the CNT sheets and is controlled using a pulse width modulation (PWM) controller 110 such as described in reference to FIG. 2, with the PWM controller 110 provided with the battery control unit 34 or provided separately. The PWM controller 110 allows current to the CNT sheets 36, 104 to be directly controlled within predetermined ranges and power levels to provide different heat-up rates for different temperature ranges of the battery pack.

A battery cell thermal conditioning system 10 of the present disclosure offers several advantages. These include thermal conditioning of a vehicle battery pack which allows for fast charging at low temperatures. Thermal conditioning helps mitigate lithium plating in lithium-ion battery cells at low temperature conditions, below a predetermined temperature threshold which can result in lithium plating. The present system operates with low energy consumption for the CNT heating sheet or pad. The present system also does not influence the cooling characteristics of the battery pack 12. CNT sheets of the present disclosure are also provided of a lightweight material with substantially no additional packaging space required.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery cell thermal conditioning system for a vehicle, comprising:
    a battery pack having battery cells;
    a carbon nanotube sheet positioned in proximity to one of the battery cells; and
    a controller directing current flow to the carbon nanotube sheet when a sensed temperature of the one of the battery cells drops below a predetermined threshold temperature; and
    a power source independent of the battery pack providing the current flow upon command from the controller.

2. The battery cell thermal conditioning system for the vehicle of claim 1, wherein the power source defines a 12 VDC battery or a 24 VDC battery.

3. The battery cell thermal conditioning system for the vehicle of claim 1, wherein the carbon nanotube sheet includes:
    a positive terminal connected to a power source positive terminal;
    a negative terminal connected to a power source negative terminal; and
    a thickness of approximately 100 microns.

4. The battery cell thermal conditioning system for the vehicle of claim 1, wherein the carbon nanotube sheet is positioned in direct contact with one of the battery cells and the controller directs the current flow to the carbon nanotube sheet until the sensed temperature of the one of the battery cells increases to a minimum optimum temperature.

5. The battery cell thermal conditioning system for the vehicle of claim 4, wherein the minimum optimum temperature is approximately 25 degrees Centigrade.

6. The battery cell thermal conditioning system for the vehicle of claim 1, further including:
    a foam layer positioned between adjacent ones of the battery cells with the carbon nanotube sheet positioned on a first side of the foam layer; and
    a second carbon nanotube sheet positioned in direct contact with a second one of the battery cells on a second side of the foam layer, the controller also directing the current flow to the second carbon nanotube sheet.

7. The battery cell thermal conditioning system for the vehicle of claim 1, wherein:
    the controller defines a pulse width modulated controller; and
    a voltage signal from the controller defines at least a 0% current flow, a 25% current flow and a 100% current flow.

8. The battery cell thermal conditioning system for the vehicle of claim 7, wherein:
    the 25% current flow is provided when the predetermined threshold temperature is at or above approximately 10 degrees Centigrade and below approximately 25 degrees Centigrade; and
    the 100% current flow is provided when the predetermined threshold temperature is below approximately zero degrees Centigrade.

9. The battery cell thermal conditioning system for the vehicle of claim 1, wherein the carbon nanotube sheet is positioned at an inner wall of a housing which contains the battery pack, the carbon nanotube sheet when energized by the current flow producing radiant heat energy acting to heat the battery pack.

10. A battery cell thermal conditioning system for a vehicle, comprising:
- a battery pack having multiple battery cells;
- a foam layer positioned between adjacent ones of the battery cells;
- a carbon nanotube sheet positioned in direct contact with one of the battery cells with the carbon nanotube sheet positioned on a first side of the foam layer; and
- a controller directing current flow to the carbon nanotube sheet when a sensed temperature of the one of the battery cells drops below a predetermined threshold temperature; and
- a power source independent of the battery pack providing the current flow upon command from the controller.

11. The battery cell thermal conditioning system for the vehicle of claim 10, wherein the controller directs the current flow to the carbon nanotube sheet until the sensed temperature of the one of the battery cells achieves a minimum optimum temperature of approximately 25 degrees Centigrade.

12. The battery cell thermal conditioning system for the vehicle of claim 10, further including a second carbon nanotube sheet positioned in direct contact with a second one of the battery cells on a second side of the foam layer, the controller also directing the current flow to the second carbon nanotube sheet.

13. The battery cell thermal conditioning system for the vehicle of claim 10, further including:
- a battery control unit receiving sensor signals from the battery pack and monitoring a voltage of the battery pack; and
- a power source defining a direct current battery independent of the battery pack providing the current flow upon command from the controller.

14. The battery cell thermal conditioning system for the vehicle of claim 10, wherein the controller defines a pulse width modulated controller allowing current to the carbon nanotube sheet to be directly controlled within predetermined ranges and power levels to provide different heat-up rates for different temperature ranges of the battery pack.

15. The battery cell thermal conditioning system for the vehicle of claim 10, wherein the foam layer is a polymeric material which is elastically compressible to allow thermal expansion and contraction of the battery cells and vibrational motion of the battery pack and the battery cells while mitigating against direct contact between any of the battery cells.

16. The battery cell thermal conditioning system for the vehicle of claim 10, wherein a determination is performed if an immediate battery demand follows a period of non-operation of the vehicle when an ambient temperature is below an optimum operating temperature of the battery pack and has not dropped to the predetermined threshold temperature, demanding current flow be initiated to the carbon nanotube sheet.

* * * * *